United States Patent Office 3,469,892
Patented Sept. 30, 1969

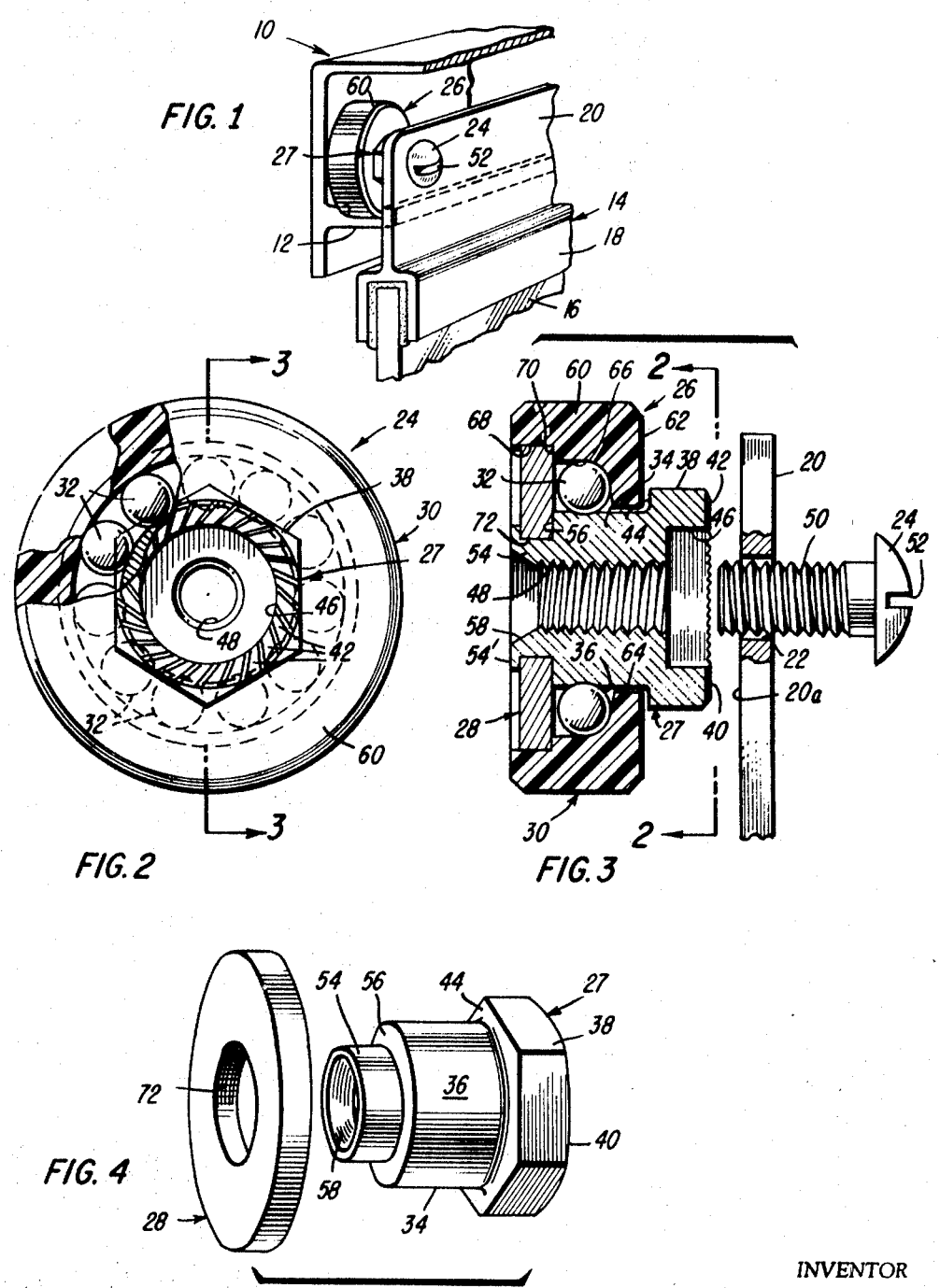

3,469,892
SHIELDED-BEARING ROLLER FOR
SUSPENSION DEVICES
Hall Langstroth, Coral Gables, Fla., assignor to
Watsco, Inc., Hialeah, Fla.
Filed June 3, 1968, Ser. No. 734,030
Int. Cl. F16c 31/04, 13/02, 35/06
U.S. Cl. 308—3.8                                              5 Claims

ABSTRACT OF THE DISCLOSURE

A support roller assembly particularly adapted for suspending shower doors, suspension drawers and the like, in which the roller is an anti-friction plastic element having an annular, lateral recess at one side forming an outer bearing race, the inner race comprising an axle projecting axially through an apertured wall and forming an inner bearing race; the axle terminally receiving a coupling washer-like element closing the roller recess, and being swaged to retain the parts in assemblied relation for retaining bearing elements and/or a lubricant in the recess; and the axle being internally threaded to receive a mounting fastener, and having a polygonal end for receiving a wrench as well as a terminal, friction surface for eliminating mounting washers.

Maintenance and repair of suspended shower doors, suspended drawers has become a major factor concern with the rise in cost of labor, scarcity of skilled labor, and rising costs of material and parts.

Primary objects of the present invention are to provide a novel roller assembly which is readily and economically manufactured; which can be readily installed and replaced; which is relatively silent in function; which is essentially self-lubricating; and which, more particularly, comprises a roller element forming an outer bearing race, includes an axle cooperating, forming an inner bearing race and which cooperates with a washer forming a substantially closed bearing recess, and in which the axle includes a wrench receiving portion adjacent a terminal friction surface, and includes a threaded bore to accommodate installation and removal of the roller assembly from a support.

These together with other objects and advantages of the invention will become apparent from a consideration of the following description when taken in conjunction with the drawing forming a part thereof, wherein:

FIG. 1 is a fragmentary perspective view of a suspended shower door and guide track, showing a roller assembly of the invention installed;

FIG. 2 is an enlarged elevational view, taken substantially on the plane of line 2—2 of FIG. 3, with portions broken away;

FIG. 3 is a vertical section taken substantially on the plane of line 3—3 of FIG. 2, showing details of a mounting flange and screw; and FIG. 4 is an enlarged, exploded perspective view, showing the axle and retaining washer of the roller assembly, prior to being assembled with a plastic roller.

Referring to the drawing in detail, and first considering FIG. 1, a guide track or rail of a shower door frame element is indicated generally at 10 and includes a lateral support flange 12. A fragmentary portion of a shower door 14 includes glazing 16, a top framing element 18, and an upper mounting flange 20. The flange 20 has extending therethrough, at one end, aperture 22; see FIG. 3, accommodating a machine screw 24 therethrough. Although not shown, the flange 20 will have another aperture 22 at the end not shown, and each end of the door will be suspended on roller wheel assemblies 26.

The roller wheel assemblies 26, in effect, provide a cantilever suspension, for the door 14. The assemblies 26 comprise a mounting axle 27, an assembly washer 28, an outer roller 30, and ball bearing elements 32.

The mounting axle 27 provides several functions, i.e. affords means to mount the roller assembly; eliminates necessity for washers; provides an inner bearing race; and provides means for assembling the roller assembly.

The axle 27 includes a relatively solid, central cylindrical portion 34, the outer surface 36 of which forming an inner bearing race for ball bearing elements 32. Formed at one end of portion 34 is a polygonal head 38 for accommodating a wrench thread thereon, and the outer surface 40 of head 38 includes a plurality of friction-increasing means such as ribs 42 which will engage the inner surface 20a of flange 20 to prevent rotation of the axle 27 after installation. The side 44 of head 38, opposite the ribs 42 is smooth and comprises a bearing surface, as will become apparent.

The axle 27 is undercut at 46 and includes an axial, internally threaded bore 48 for receiving the threaded shank 50 of the machine screw 24. The machine screw 24 includes a transverse kerf 52 for receiving the blade of a screwdriver, but can comprise a "Phillips" or polygonally headed screw if so desired.

At the other end of the cylindrical portion 34 is a reduced diameter, relatively thin sleeve 54 forming a shoulder 56, and the sleeve will be deformable for purposes of assembly and can be reduced in area by means of a terminal, countersunk portion 58.

The roller 30 is preferably molded and produced from "nylon," "Teflon," "Delryn," "Celcon," or the like which in addition to providing an anti-friction material also eliminates any metallic sound as the rollers move on rail 10, for example. The roller 30 comprises a cylindrical body 60, peripherally relieved at its edges and includes at one side a terminal wall 62, centrally apertured at 64 and receiving the cylindrical portion 34 of the axle 27 therethrough. The outer surface of wall 62 provides an anti-friction surface for side or shoulder 44 of head 38 and thus prevents binding as the door 14 is slid and the roller rolls on the track 10.

The body 60 has formed therein, at one side of wall 62 and in circumposed relation about the cylindrical portion 34 of the axle, an outer bearing race 66 which accommodates the ball bearings 32 therein. The bearing race 66 is formed as an axial recess opening away from wall 62 and includes an increased diameter portion 68 forming a shoulder 70, axially spaced from wall 62 to permit free movement of the bearings 32. The axial length of the cylindrical portion 34 is such as to provide proper clearances and permit free rotation of the body 60 on the axle.

The assembly washer 28 is preferably metal and is centrally apertured at 72 to accommodate the sleeve 54 therethrough. The outer diameter of the washer 28 substantially corresponds to the increased diameter portion 68 of body 60 and will essentially seal the bearing recess when seated on shoulder 70. A suitable packing grease can be inserted in the bearing recess, and the terminal edge 54' of the sleeve is deformed or swaged over as seen in FIG. 3.

It will be noted that during installation of the roller assembly head 38 can be conveniently engaged by a suitable wrench while the machine screw 24 is driven by a screwdriver engaging kerf 52. The ribs 42 will engage the plate or flange 20 and tend to dig into this side of the mounting flange, thus eliminating the need for a lock washer. The roller assembly is essentially "cantilever" and thus torque or thrust imposed on the axle is transmitted to the innermost surface of the outer bearing race 66. Dust is kept out of the bearing recess by washer 28 and grease is retained in the recess. The body 60 provides a bearing surface between wall 62 and surface 44 of head 38. Further, the body portions 68 and 70 of the roller provide a bearing surface to permit the body to rotate relative to the axle and washer. The washer 28, and its cooperation with shoulder 56 and 70 on the axle and roller orient the axle and roller in concentric or axial alignment thus preventing uneven wear on the bearing parts.

What is claimed:

1. A roller assembly for suspending a displaceable member such as a sliding door, drawer or the like, comprising, in combination:

a mounting axle including an axial, threaded bore for receiving a mounting screw therein, said axle including a central, cylindrical portion integral with a polygonal head at one end and defining a shoulder therewith, the outer surface of said cylindrical portion comprising an inner bearing race, an anti-friction, plastic roller circumposed about said axle and including an annular, radiused, axial recess defining an outer bearing race, a plurality of ball bearings disposed in said axial recess between said bearing races; and a retaining washer circumposed about said axle and closing said axial recess, said washer element being connected to said roller and said axle for retaining said axle, roller, and bearings in assembled relationship.

2. The structure as claimed in claim 1 in which said polygonal head includes a terminal axially-projecting friction portion for preventing rotation of said axle with respect to a mounting flange.

3. The structure as claimed in claim 1 in which said roller includes an apertured side wall through which said axle projects, said shoulder having friction engagement with the outer surface of said side wall.

4. The structure as claimed in claim 1 in which said axle includes a terminal, reduced-diameter sleeve defining an orienting shoulder therewith, said roller recess including an enlarged diameter, terminal portion circumposed about said axle shoulder, said retaining washer having the terminal, axle sleeve projecting therethrough and being seated at inner and outer peripheral portions at said axle and roller shoulders, respectively, said terminal sleeve being deformed at the outer surface of said washer and maintaining the parts in assembled relation, said recess being substantially sealed by the inner surface of said roller side wall and said washer.

5. The structure as claimed in claim 4 in which said polygonal head includes a terminal, axially-projecting anti-friction portions for preventing rotation of said axle with respect to a mounting flange.

References Cited

UNITED STATES PATENTS

| | | | |
|---|---|---|---|
| 1,751,453 | 3/1960 | Beemer | 308—190 |
| 1,784,910 | 12/1960 | Rowntree | 16—106 |
| 1,901,648 | 3/1933 | Howard | 16—98 |
| 1,963,592 | 6/1934 | Pribil | 308—190 |
| 2,805,107 | 9/1957 | Van de Warker | 16—107 X |
| 3,148,005 | 9/1964 | Pusztay | 308—6 |
| 3,271,826 | 9/1966 | Jackson | 308—15 X |
| 3,293,685 | 12/1966 | Rosenbaum | 16—98 X |

FOREIGN PATENTS 884,170  12/1961  Great Britain.

MARTIN P. SCHWADRON, Primary Examiner
LUCIOUS L. JOHNSON, Assistant Examiner

U.S. Cl. X.R.

16—97, 98; 308—6, 15, 22, 190, 191, 195